(12) United States Patent
Nielsen et al.

(10) Patent No.: US 7,306,758 B2
(45) Date of Patent: Dec. 11, 2007

(54) METHODS AND SYSTEMS FOR CONTROLLING PRINTHEAD TEMPERATURE IN SOLID FREEFORM FABRICATION

(75) Inventors: Jeffrey A Nielsen, Corvallis, OR (US); Stephen A. Loughran, Bristol (GB); Steven T Castle, Philomath, OR (US); Darrel H. Cummings, Tucson, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 10/388,949

(22) Filed: Mar. 13, 2003

(65) Prior Publication Data

US 2004/0178531 A1    Sep. 16, 2004

(51) Int. Cl.
*B28B 1/32* (2006.01)
*B28B 1/16* (2006.01)
*B28B 1/00* (2006.01)
*B28B 11/08* (2006.01)
*B28B 23/00* (2006.01)

(52) U.S. Cl. .............. 264/308; 264/40.1; 264/401; 264/112; 264/113

(58) Field of Classification Search ........... 347/107; 264/401, 308, 40.1, 112, 113; 427/427.2, 427/427.3, 427.4
See application file for complete search history.

(56) References Cited

U.S. PATENT DOCUMENTS

| | | | | |
|---|---|---|---|---|
| 4,791,435 A | * | 12/1988 | Smith et al. | 347/17 |
| 4,910,528 A | * | 3/1990 | Firl et al. | 347/17 |
| 5,059,266 A | * | 10/1991 | Yamane et al. | 156/64 |
| 5,260,009 A | * | 11/1993 | Penn | 264/401 |
| 5,610,638 A | * | 3/1997 | Courtney | 347/14 |
| 6,165,406 A | | 12/2000 | Jang et al. | |
| 6,214,279 B1 | | 4/2001 | Yang et al. | |
| 6,405,095 B1 | | 6/2002 | Jang et al. | |
| RE37,875 E | | 10/2002 | Lawton | |
| 2002/0145213 A1 | | 10/2002 | Liu et al. | |

FOREIGN PATENT DOCUMENTS

| | | |
|---|---|---|
| JP | 2000-238379 | 9/2000 |
| JP | 2001-088289 | 4/2001 |
| JP | 2003-531220 | 10/2003 |
| JP | 2003-535712 | 12/2003 |
| WO | WO01/26023 A1 | 4/2001 |

* cited by examiner

*Primary Examiner*—Christina Johnson
*Assistant Examiner*—Matthew J. Daniels

(57) ABSTRACT

A solid freeform fabrication system including a three-dimensional fabricator with a plurality of pens and a controller configured to evaluate pen information and to control the pens to reduce a temperature of the pens.

8 Claims, 13 Drawing Sheets

METHODS AND SYSTEMS FOR CONTROLLING PRINTHEAD TEMPERATURE IN SOLID FREEFORM FABRICATION

BACKGROUND OF THE INVENTION

Solid Freeform Fabrication (SFF) is a general term for using one of several technologies to create three-dimensional objects such as prototype parts, models, and working tools. Solid freeform fabrication is an additive process in which an object, which is described by computer readable data, is automatically built, usually layer-by-layer, from base materials.

Several principal forms of solid freeform fabrication involve a liquid ejection process. There are two main types of solid freeform fabrication that use liquid-ejection: binder-jetting systems and bulk jetting systems.

Binder-jetting systems create objects by ejecting a binder onto a flat bed of powdered build material. Each powder layer may be dispensed or spread as a dry powder or a slurry. Wherever the binder is selectively ejected into the powder layer, the powder is bound into a cross section or layer of the object being formed.

Bulk-jetting systems generate objects by ejecting a solidifiable build material and a solidifiable support material on a platform. The support material, which is temporary in nature, is dispensed to enable overhangs in the object and can be of the same or different material from the object.

In both cases, fabrication is typically performed layer-by-layer, with each layer representing another cross section of the final desired object. Adjacent layers are adhered to one another in a predetermined pattern to build up the desired object.

In addition to selectively forming each layer of the desired object, solid freeform fabrication systems can provide a color or color pattern on each layer of the object. In binder-jetting systems, the binder may be colored such that the functions of binding and coloring are integrated. In bulk-jetting systems, the build material may be colored.

Inkjet technology can be employed in which a number of differently colored inks are selectively ejected from the nozzles of a liquid ejection apparatus and blended on the build material to provide a full spectrum of colors. Often, the liquid ejection apparatus consists of multiple printheads, each ejecting a different base-colored binder or build material, such as cyan, magenta, yellow, black, and/or clear. On each individual layer, conventional two-dimensional multi-pass color techniques and half-toning algorithms can be used to hide defects and achieve a broad range of desired color hues.

One of the on-going deficiencies of the solid freeform fabrication techniques described above is the control of the temperature within the printheads during the liquid jetting process. Either of these liquid-ejection methods relies on jetting large quantities of material at high frequencies through Inkjet printheads to create objects. When Thermal Inkjet (TIJ) Printheads are used in liquid-ejection fabrication methods, this heavy load can create thermal issues where the printhead(s) will run at elevated temperatures for long periods of time. These elevated temperatures can lead to longevity and performance issues with the printheads. More specifically, high temperatures can lead to degradation of interfaces within the printhead. This can happen as the glass-transition temperature of the various interfaces is approached or exceeded. High temperatures can also lead to out-gassing of dissolved air from the binder solution being fired from the printhead. Over time, this has the effect of filling the printhead with trapped air until the point where ink can no longer reach the nozzles, at which point the nozzles de-prime. High temperatures can also lead to erratic behavior of drops being ejected from the nozzles, with secondary jetting leading to additional spray and poor directionality of the ejected drops. Even moderate temperature changes can alter the size of the drops resulting in color or property changes. Accordingly, it would be helpful to be able to control pen temperature(s), more specifically, printhead temperature(s), in a solid freeform fabrication system without reducing or significantly reducing dispense speed. The term "pen" refers to the ink delivery system and printheads, independent of whether the ink supplies are on- or off-axis. In a multiple-printhead system, where the printheads are thermally isolated from each other, it would also be helpful to be able to spread out (distribute) the load more evenly between the plurality of printheads and thereby increase the mean-time-between failures.

BRIEF DESCRIPTION OF THE DRAWINGS

Detailed description of embodiments of the invention will be made with reference to the accompanying drawings.

DETAILED DESCRIPTION

Figure 1:
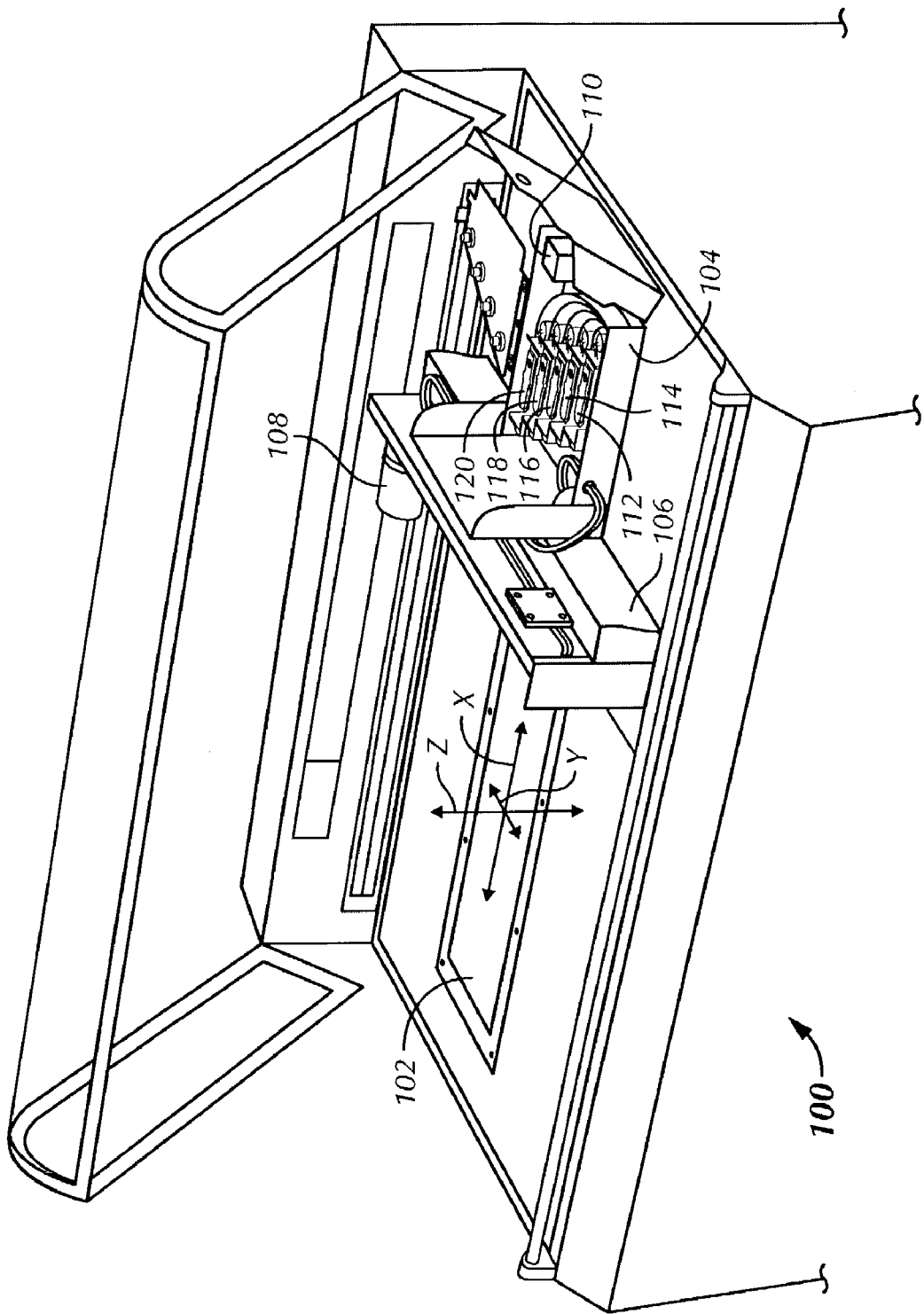
FIG. 1 is a perspective view of a SFF tool configured to implement the pen temperature control principles of the present invention.

The following is a detailed description of the best presently known mode of carrying out the invention. This description is not to be taken in a limiting sense, but is made merely for the purpose of illustrating the general principles of the invention.

The present invention relates to various methods and systems for controlling pen temperature in Solid Freeform Fabrication. Various methods and systems of the present invention exploit the fact that the appearance of the core (the inside of the part that is not on the surface) is irrelevant on a 3D object and generally involve rearranging the objects of a fabrication build in advantageous ways in the space available.

Rather than making the unseen core entirely out of clear binder (e.g., in a 4-printhead system that uses clear, cyan, magenta, and yellow), various embodiments of the present invention take advantage of the other pens in the system for creating the core by mixing colored material into the core. The term "binder" refers to adhesives or any other substances that are ejected to selectively bind a build material together into a desired product. If colored material is used in the core, along with clear, then the clear pen is used less, giving it a chance to cool. This also increases the likelihood of the object remaining intact in the event of a catastrophic failure of a single pen, as the core will still be bonded with other pens. By way of example, the binding of the core can be accomplished according to this technique using a static ratio of colored binder such as 25% C, 25% Y, 25% M, and 25% clear.

In another embodiment, the ratio of clear to color is dynamically determined based on the current temperature and/or the details of the swath: e.g., the fabricator determines what the likely temperatures at the end of the swath will be and replaces clear with color as needed to keep the temperature in a desired range.

In another embodiment, a color-choosing algorithm (or protocol) is employed for each layer to select colors which would not otherwise be dispensed on the current layer, or, based on printhead use statistics, dispense those colors which are used least.

In the interest of preventing or lessening any decrease in dispensing speed, the color used for the core is preferably chosen to minimize sweep overscan. In order to be able to more quickly decelerate the printhead, the replacement pen should not be positioned such that it causes an increase in sweep time (e.g., by being positioned after the clear pen relative to the direction of the swath).

In yet another embodiment, a de-primed pen is identified during the build process (e.g., through a temperature excursion or other technique) and the core is filled using the still-functioning pens.

Other methods and systems for controlling pen temperature according to the present invention involve using multiple monochrome pens to fill the core. For example, a second clear pen is added to a conventional 4-printhead system (with clear, cyan, magenta, and yellow pens) to provide a 5-printhead system. By way of example, an algorithm or protocol to control the core filling functionality of such a 5-printhead system can be configured to start with a 50% distribution between the two clear pens. In another embodiment, smart temperature sensing (e.g., "drops fired/Delta T" ratio) can be used to determine which of the two clear pens runs hotter and which runs cooler. A gradually higher ratio of deposition can be shifted to the cooler running pen to prolong the life of both pens. If one of the clear pens becomes de-primed, 100% of the clear deposition can be shifted to the other pen. This makes catastrophic build losses much less likely by allowing part integrity even with the loss of one of the clear pens.

Other methods and systems for controlling pen temperature according to the present invention involve reducing the starting temperature for the pens. For better deposition accuracy and to reduce delta T, many thermal inkjet printheads need to be operated above a threshold temperature, which for many printheads is 45° C. or higher. While various techniques (such as "pulse warming", "block heating" or "trickle warming") can be used to add energy to the printhead before a dispensing swath is started to provide better drop placement with the first drop out of the nozzle as a consequence, less heavy dispensing can be done before the printhead starts running into the thermal ceiling, which is often 70° C. For dispensing the core, there is less of a concern for accuracy, so a lower starting temperature, such as 35° C. is acceptable. With a lower starting temperature, the resulting first drops may be more erratic and somewhat smaller, but this does not materially affect object quality, since the core is not seen. Thus, according to various embodiments of the present invention, a lower starting temperature for the pens is employed which allows more heavy dispensing before the thermal limits are reached. By way of example, an algorithm or protocol to control the core filling can be configured to identify which of the pen(s) dispensing the core were not used or lightly used at the edges (the shell), and then reduce the base temperature for these pen(s). Even if a small number of edge pixels (such as 10,000) were deposited, the accuracy error would not be particularly noticeable so the cooling could still be permitted. In various embodiments, the algorithm or protocol is configured to "look ahead" at the dispensing swaths to determine what the future edge and code workload of the pens will be.

If these algorithms still do not eliminate excessive temperature, additional algorithms can be invoked to protect the printheads. These include pausing between swaths or increasing the number of swaths and reducing the density on any one swath. These methods will slow build time but prevent premature printhead failure.

Other methods and systems for controlling pen temperature according to the present invention involve rearranging the layout of objects for optimizing or controlling the thermal load. For example, the build server can be configured to lay out objects in the bin in such a way as to provide time for heads to cool between objects by providing a horizontal gap between objects. In other embodiments, parts are intentionally misaligned in the vertical axis, so that the total amount of dense shell dispensed on a single layer or the total amount of core is kept below a threshold. In other embodiments, the vertical tops of objects are aligned so that multiple objects finish on the same layer. This permits a brief pause in the entire job for the printhead to cool down.

Other embodiments involve rotating objects such that a solid block of core material extends more vertically than horizontally. This technique sometimes involves a tradeoff between pen temperature and build speed, but is particularly beneficial for objects whose dimensions are significantly different along the different axes. In some cases, dispensing without pausing a taller part (i.e., a part with more layers) results in a faster build speed than dispensing with pausing a shorter part (with fewer layers).

Other embodiments involve mixing (arranging) parts such that while the solid core of one object is being dispensed, the adjacent parts are smaller and/or in the color deposition phase of construction, rather than requiring more core material.

In various embodiments, computer control of the build process facilitates orienting the parts for maximum strength and smoothness of surfaces; the vertical dimension of the object has different characteristics from the horizontal. In various embodiments, the build process is controlled taking into account user inputs with respect to preferred part orientation, specifications of output quality requirements, and other build parameters.

In various embodiments, object arranging takes place before the dispensing actually begins, i.e., as a "pre-processing step". Information pertaining to pen and system performance (such as change in temperature vs. drop fired and change in temperature vs. time at rest) is used to predict pen performance during the dispensing process.

A solution that falls within the temperature limits of the system, determined by making an appropriate tradeoff between build speed and pen temperature, does not necessarily have to be the best or optimal solution in terms of minimizing temperature. Accordingly, a process can start by generating a close packed bin (for fast dispensing) and then scan for any temperature problems. If problems are detected, objects can then be separated horizontally and/or vertically. By way of example, rotation need only be considered if a preliminary analysis of an object indicates a significant object dimensional bias (e.g., being longer in one axis than in the others). Further analysis can be used to determine how the object should be rotated to minimize its per-layer core surface area, e.g., identifying the longest single dimension of the object and rotating the object until that longest single dimension aligns with the vertical axis.

Other methods and systems according to the present invention involve arranging the output bin for a "graceful" or less catastrophic failure taking into account the risk of job failure associated with each of the objects and/or the relative priority or importance of the objects. By way of example, a large object for which there is a greater risk of pen failure is arranged relative to the other objects such that it will be dispensed last or toward the end of the fabrication process thus increasing the chances that the smaller objects will be completely dispensed before a failure. In other words, large, risky objects are identified as such and placed at or near the top of the bin so that any failure to complete such objects will not affect the objects beneath them. Also by way of example, the objects can be arranged such that the least important objects are dispensed last or toward the end of the fabrication process.

Referring to FIG. 1, an exemplary SFF tool such as three-dimensional fabricator 100 configured to implement the pen temperature control principles of the present invention includes a build bin 102, printhead/carriage assembly 104, scan axis transport mechanism 106 and powder spread axis transport mechanism 108. After each layer of the 3D object is fabricated, the build bin 102 (in which the object sits) is repositioned downward along the z-axis so that the next layer of the object can be formed on top of the previously formed layer. The scan axis and powder spread axis transport mechanisms 106, 108 comprise, by way of example, motorized transport mechanisms which are attached to the printhead/carriage assembly 104 and move in the y and x axes, respectively, along slide bars. The three-dimensional fabricator 100 also includes a controller 110 which is programmed to, inter alia, control the aforementioned repositioning of the printhead/carriage assembly 104 during the 3D object fabrication process. Although the controller 110 is shown as being a discrete module positioned proximate to the printhead/carriage assembly 104, it should be understood that the operations performed by the controller 110 can be distributed among a plurality of controllers, processors or the like, and that the controller 110 can be remotely located relative to the printhead/carriage assembly 104.

The printhead/carriage assembly 104 (shown with its cover open) also includes a plurality of pens. In this illustrated exemplary embodiment, the plurality of pens includes five cartridges/printheads: clear 112, clear 114, cyan 116, magenta 118, and yellow 120, configured in the printhead/carriage assembly 104 as shown. It should be appreciated that the principles of the present invention are not limited to a printhead/carriage assembly with five pens. Nor are they limited to selecting only clear, cyan, magenta and yellow pens, or to any particular ordering or spatial arrangement of the pens within the printhead/carriage assembly 104.

The printhead/carriage assembly 104 also includes a plurality of sensors (not shown) for providing pen information to the controller 110. By way of example, the pen information includes one or more of: pen temperature information, pen usage information (e.g., pertaining to current pen usage, past pen usage and/or future pen usage), and pen functionality/health information (e.g., pertaining to whether pens are operational, pass diagnostic tests, etc.). The controller 110, in various embodiments of the present invention, is configured (programmed) to evaluate the pen information and to control the pens to reduce a temperature of the pens. Thus, a solid freeform fabrication system according to one embodiment of the present invention includes a three-dimensional fabricator with a plurality of pens and a controller configured to evaluate pen information and to control the pens to reduce the temperature of the pens. In another embodiment, the pens include different colored ink dispensing pens and the controller is configured to dispense an object core by selectively employing the different colored ink dispensing pens depending upon the pen information. In another embodiment, the pens include two or more clear ink dispensing pens and the controller is configured to dispense an object core by selectively employing the two or more clear ink dispensing pens depending upon the pen information. In another embodiment, the controller is configured to reduce a starting temperature for the pens depending upon the pen information. Thus, an exemplary solid freeform fabrication system according to the present invention includes a three-dimensional fabricator including a plurality of pens and means for evaluating one or more parameters pertaining to the pens and for controlling a temperature of the pens by selectively employing the pens to fabricate objects depending upon the one or more parameters.

A solid freeform fabrication system according to another embodiment of the present invention includes a three-dimensional fabricator with a plurality of pens and a controller configured to predict pen temperatures that would result from employing the three-dimensional fabricator to fabricate a plurality of objects positioned relative to each other according to different object layouts and to select one of the object layouts for a build job depending upon the predicted pen temperatures. In various embodiments, the different object layouts provide different spacings between the objects. In various embodiments, the different object layouts provide different object orientations.

Figure 2A:
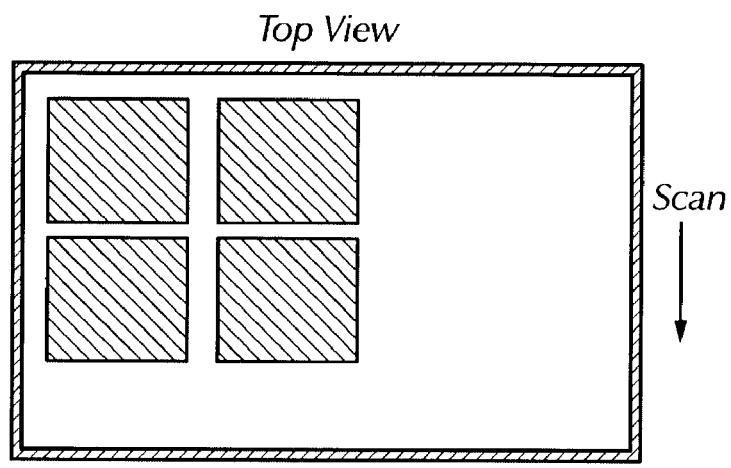
FIGS. 2A, 2B and 2C respectively show top, side and slice views of a build bin layout of four objects.
Figure 2B:
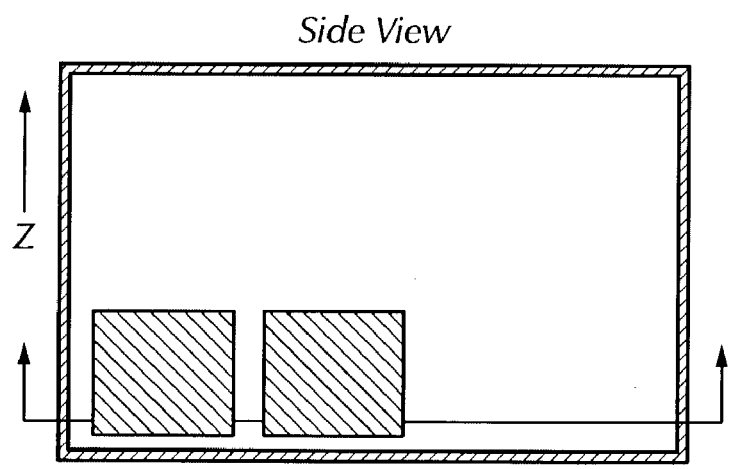
Figure 2C:
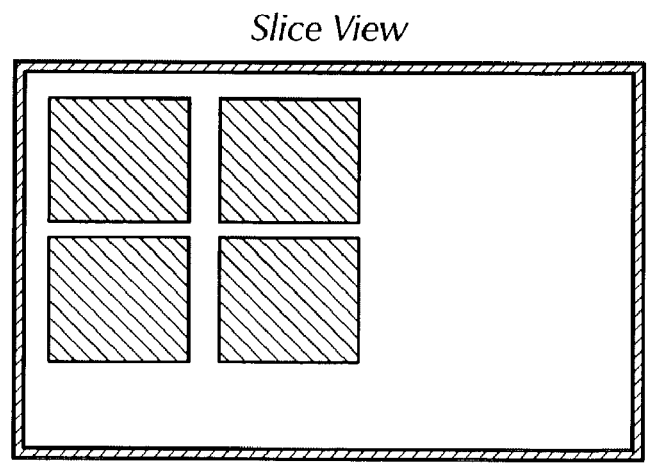
Figure 3A:
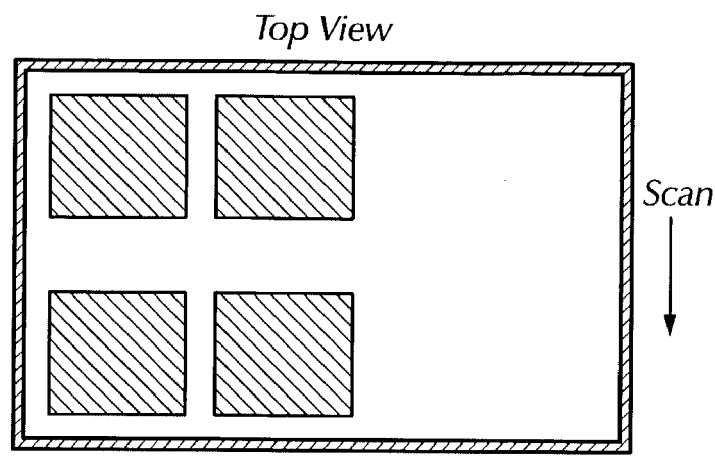
FIGS. 3A, 3B and 3C respectively show top, side and slice views of a build bin layout of the four objects of FIGS. 2A, 2B and 2C wherein the objects have been spread apart along the scan direction according to a pen temperature control method detailed in the present invention.
Figure 3B:
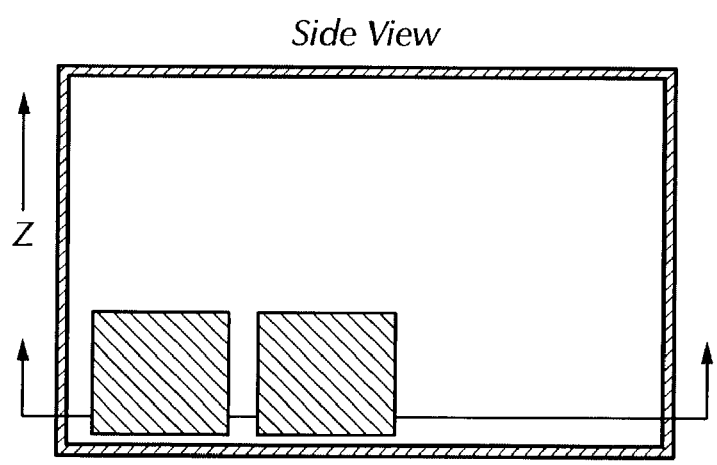
Figure 3C:
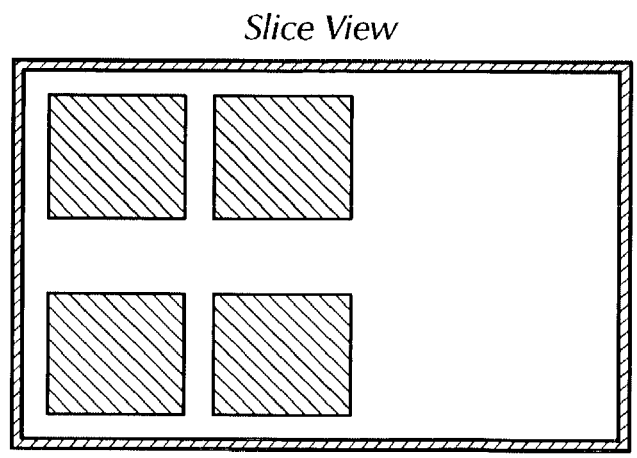
Figure 4A:
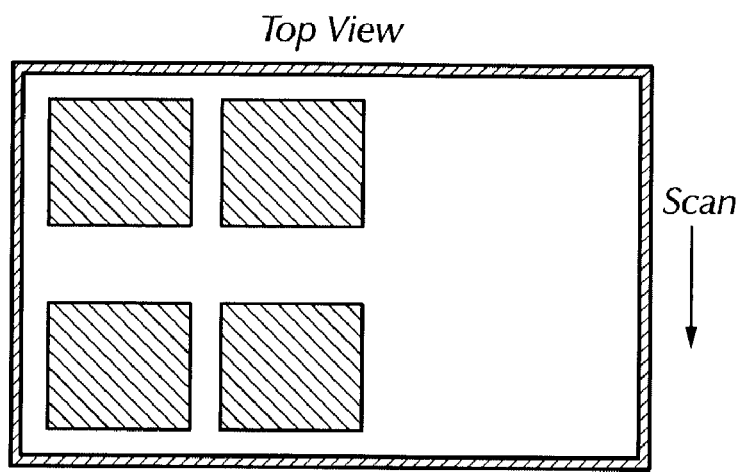
FIGS. 4A, 4B and 4C respectively show top, side and slice views of a build bin layout of the four objects of FIGS. 2A, 2B and 2C wherein the objects have been spread apart along the z-axis according to a pen temperature control method detailed in the present invention.
Figure 4B:
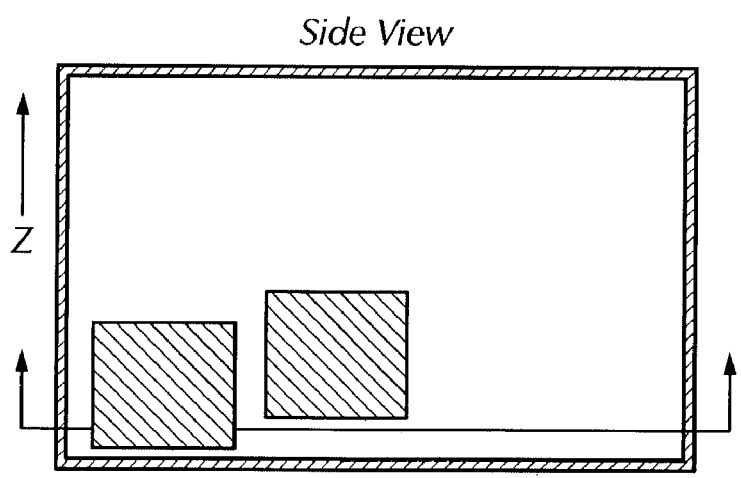
Figure 4C:
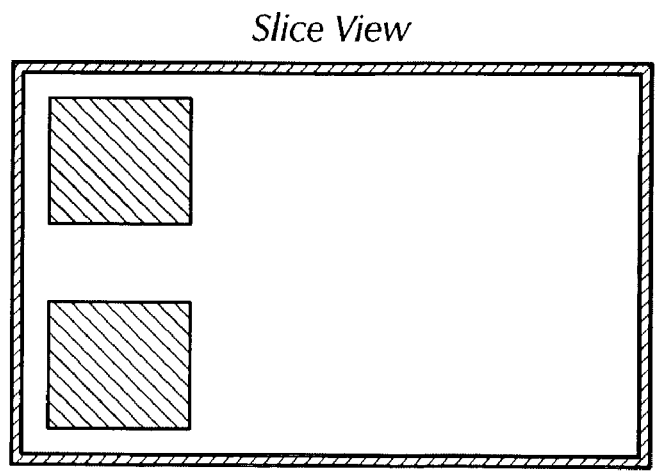
Figure 5A:
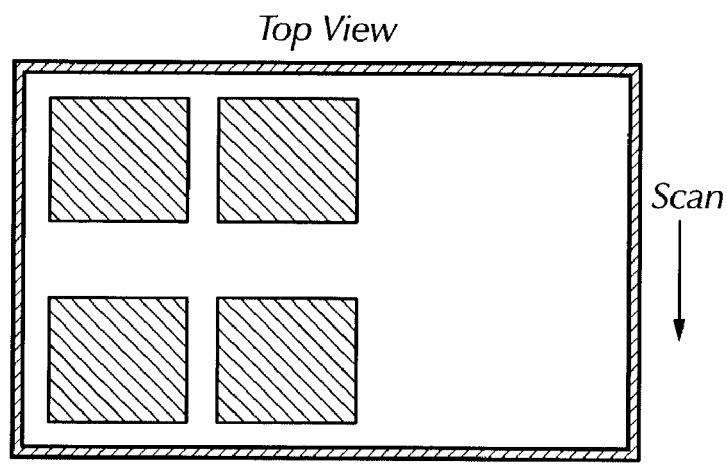
FIGS. 5A, 5B and 5C respectively show the top, side and slice views of FIGS. 4A, 4B and 4C later in the build process.
Figure 5B:
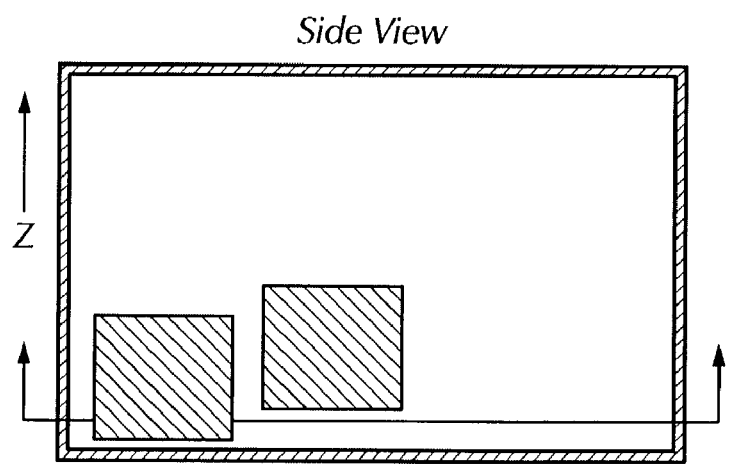
Figure 5C:
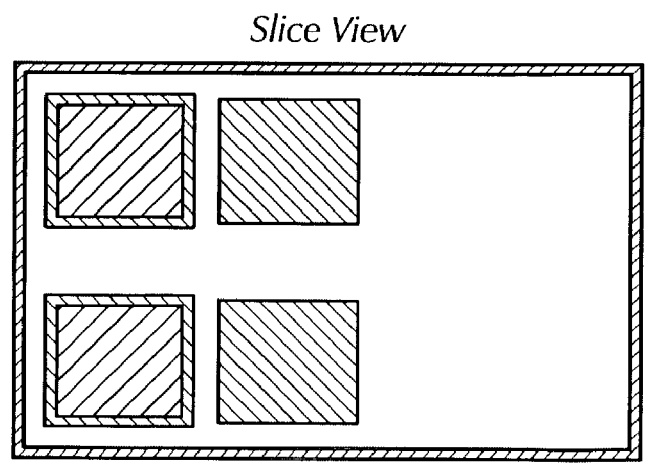

By way of example, top, side and slice views of an initial build bin layout (FIGS. 2A, 2B and 2C, respectively) show four objects positioned adjacent each other and at a common depth along the z-axis. A different object layout is shown in FIGS. 3A, 3B and 3C where the objects have been spread apart along the scan direction according to a pen temperature control method described in the present invention. This layout—determined, for example, by a part (object) spreading algorithm—provides more time in each scan swath for cooling than the layout shown in FIGS. 2A, 2B and 2C. Another exemplary object layout is shown in FIGS. 4A, 4B and 4C where the objects have been spread apart along the z-axis according to a pen temperature control method described in the present invention. This layout—determined, for example, by a z-axis movement algorithm—spreads out or distributes the load during shell building by moving two of the objects up along the z-axis. FIGS. 5A, 5B and 5C respectively show the top, side and slice views of FIGS. 4A, 4B and 4C later in the build process when the left parts are now dispensing core (low density), while the right parts are dispensing shell. By way of example, a ⅒ inch thick external shell is at 100% saturation and the core is at 50% saturation.

Figure 6A:
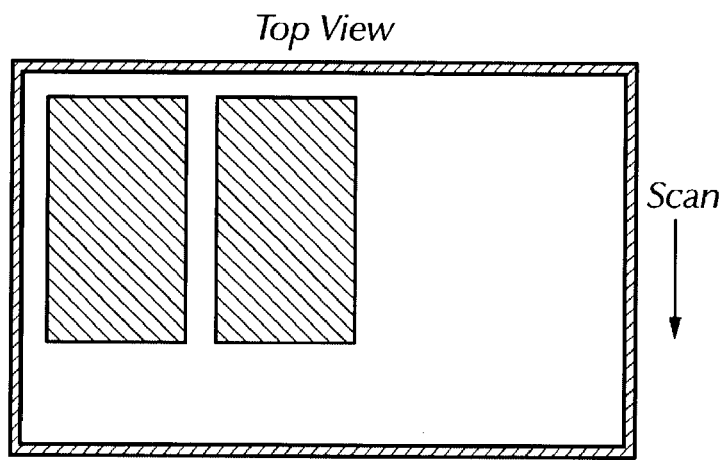
FIGS. 6A, 6B and 6C respectively show top, side and slice views of a build bin layout of two heavy load objects.
Figure 6B:
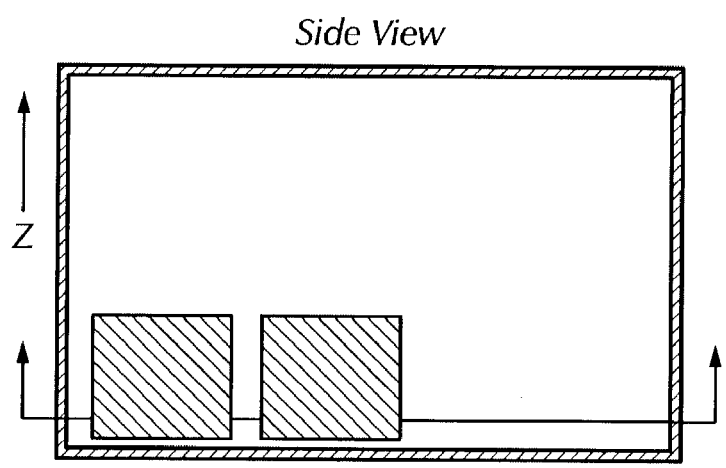
Figure 6C:
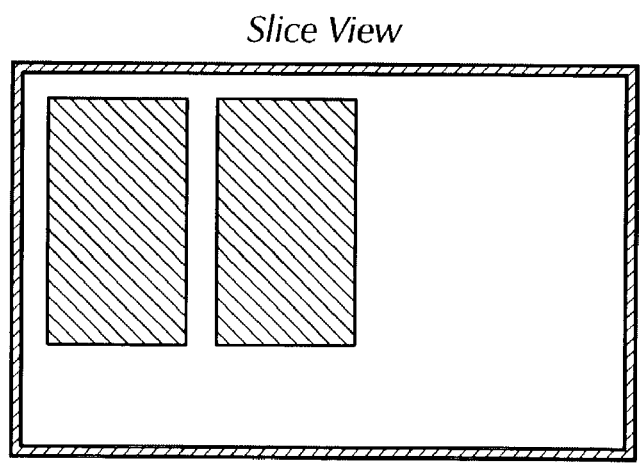
Figure 7A:
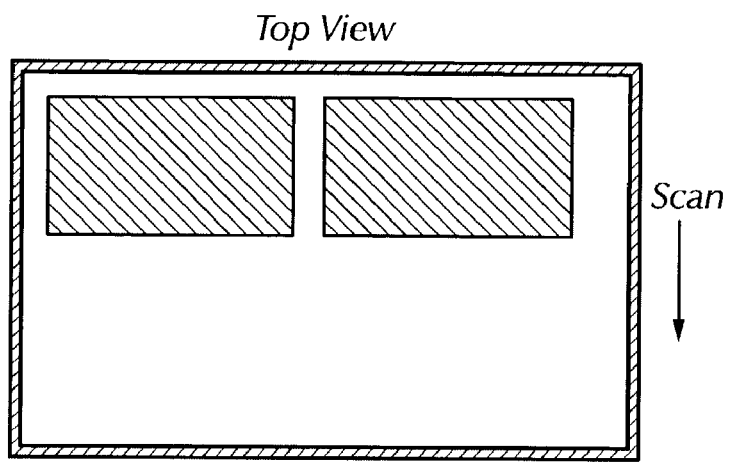
FIGS. 7A, 7B and 7C respectively show top, side and slice views of a build bin layout of the two objects of FIGS. 6A, 6B and 6C wherein the objects have been rotated in the x-y plane according to a pen temperature control method detailed in the present invention.
Figure 7B:
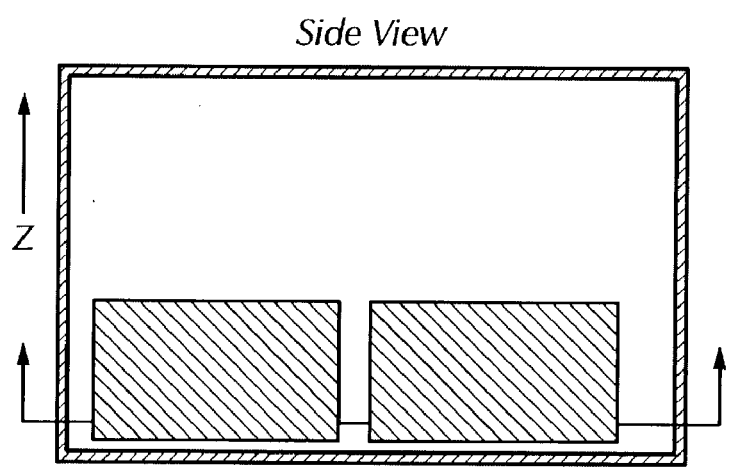
Figure 7C:
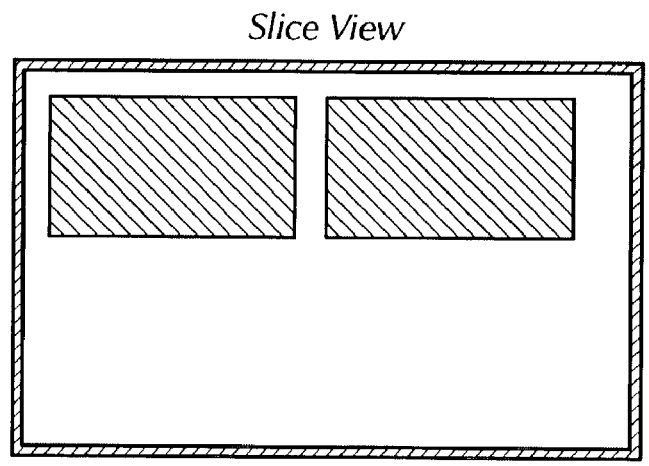
Figure 8A:
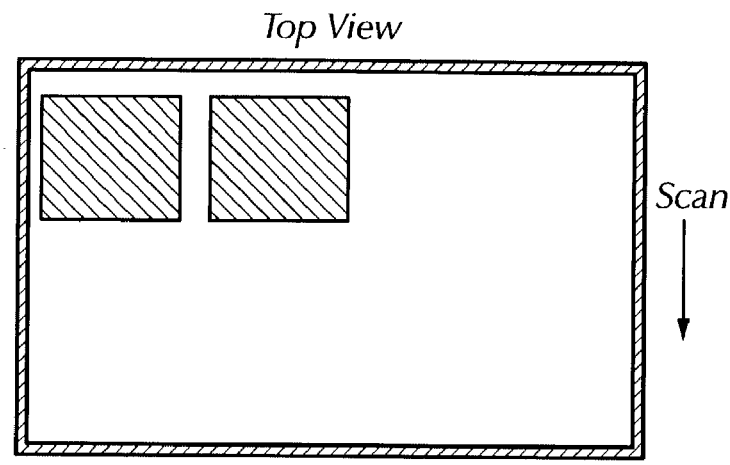
FIGS. 8A, 8B and 8C respectively show top, side and slice views of a build bin layout of the two objects of FIGS. 6A, 6B and 6C wherein the objects have been rotated up (along the z-axis) to distribute the load over more layers according to a pen temperature control method detailed in the present invention.
Figure 8B:
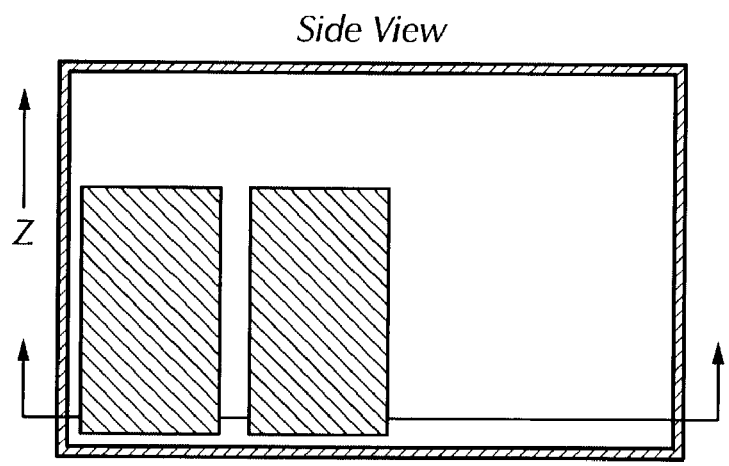
Figure 8C:
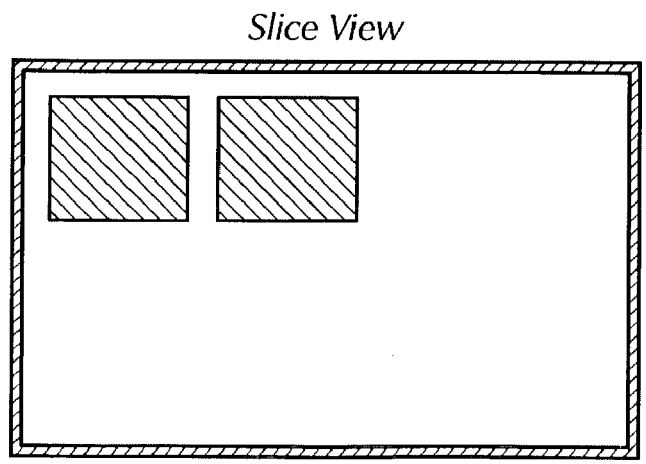

FIGS. 6A, 6B and 6C respectively show top, side and slice views of a build bin layout of two heavy load objects. A different object layout is shown in FIGS. 7A, 7B and 7C where the objects have been rotated in the x-y plane according to a pen temperature control method the present invention. This layout—determined, for example, by a part rotating algorithm—spreads the load out over more swaths which provides more cooling time than the layout shown in FIGS. 6A, 6B and 6C. Still another object layout is shown in FIGS. 8A, 8B and 8C where the objects have been rotated up (along the z-axis) to distribute the load over more layers according to a pen temperature control method the present invention. This layout—determined, for example, by a part rotating algorithm—spreads the load out over more layers which enables more cooling than the layout shown in FIGS. 6A, 6B and 6C.

Figure 9A:
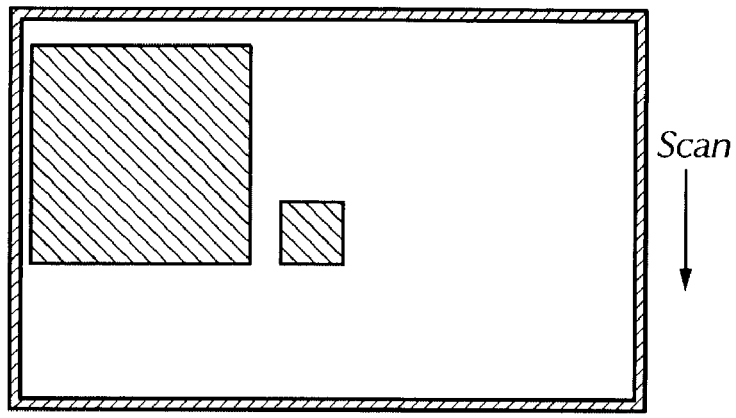
FIGS. 9A, 9B and 9C respectively show top, side and slice views of a build bin layout of three small objects and one heavy load object.
Figure 9B:
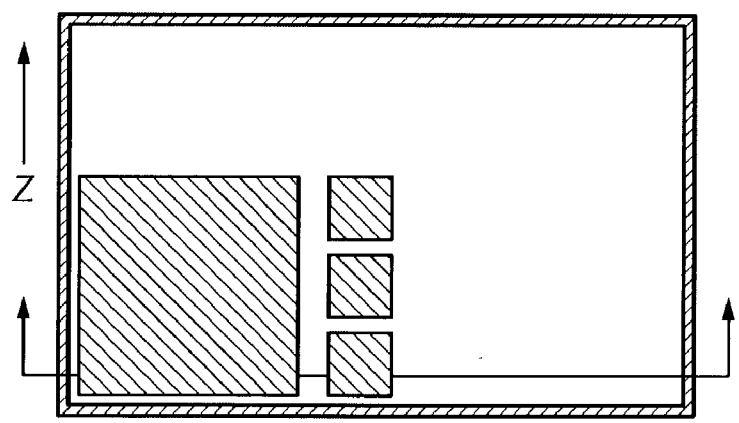
Figure 9C:
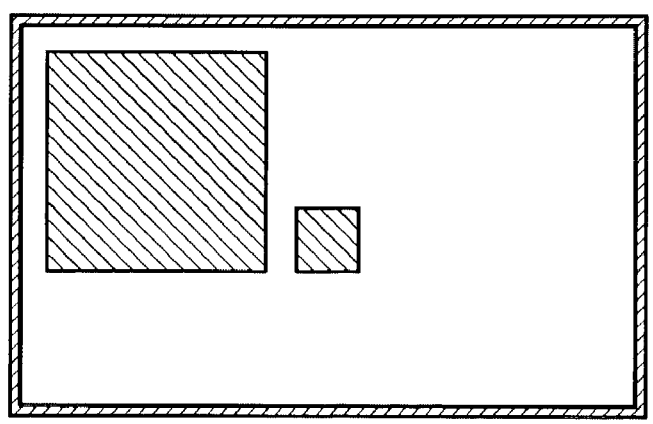
Figure 10A:
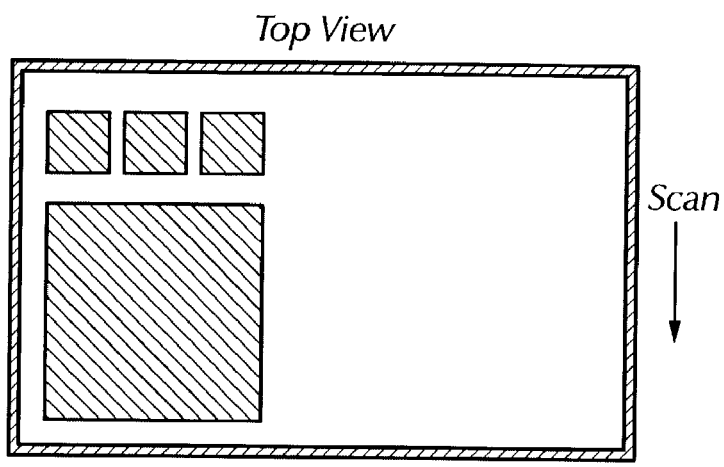
FIGS. 10A, 10B and 10C respectively show top, side and slice views of a build bin layout of the objects of FIGS. 9A, 9B and 9C wherein the objects have been rearranged such that the heavy load object is built after the small objects according to a pen temperature control method detailed in the present invention.
Figure 10B:
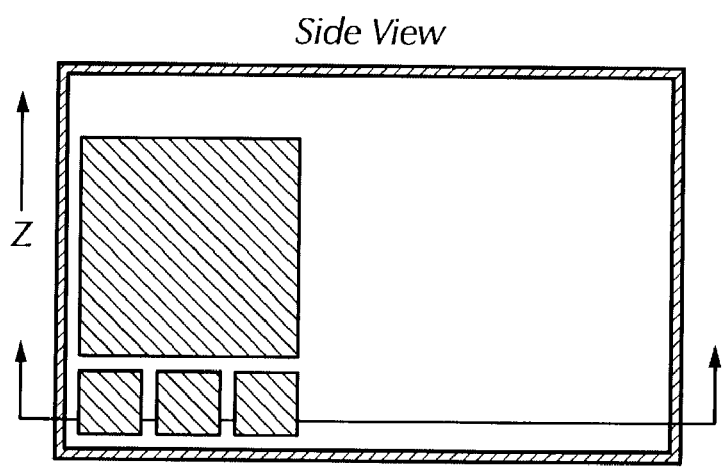
Figure 10C:
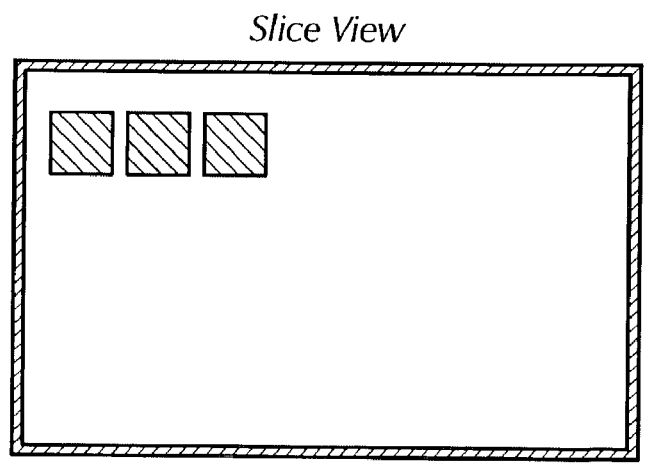

FIGS. 9A, 9B and 9C respectively show top, side and slice views of a build bin layout of three small objects and one heavy load object. In this "non-robust" layout, the heavy block imposes a large load throughout the entire build; accordingly, the smaller parts are in jeopardy if the large part causes a printhead failure. Referring to FIGS. 10A, 10B and 10C, a different build bin layout of the objects is shown where the objects have been rearranged such that the heavy load object is built after the small objects according to a pen temperature control method described in the present invention. In this example, the heavy load object and the small objects are also offset relative to each other in the x-y plane. This layout—determined, for example, by a job failure likelihood minimization algorithm—provides for building the small parts early so that if the large heavy-load part causes a printhead failure, the small parts will still be usable.

As exemplified above, in various embodiments of the present invention object layouts are selected depending upon predicted pen temperatures. Thus, according to another embodiment of the present invention, a solid freeform fabrication system includes a three-dimensional fabricator with a plurality of pens and mechanism for predicting pen temperatures that would result from employing the three-dimensional fabricator to fabricate a plurality of objects positioned relative to each other according to different object layouts and for controlling the temperature of the pens by selecting one of the object layouts for a build job depending upon the predicted pen temperatures.

Figure 11:
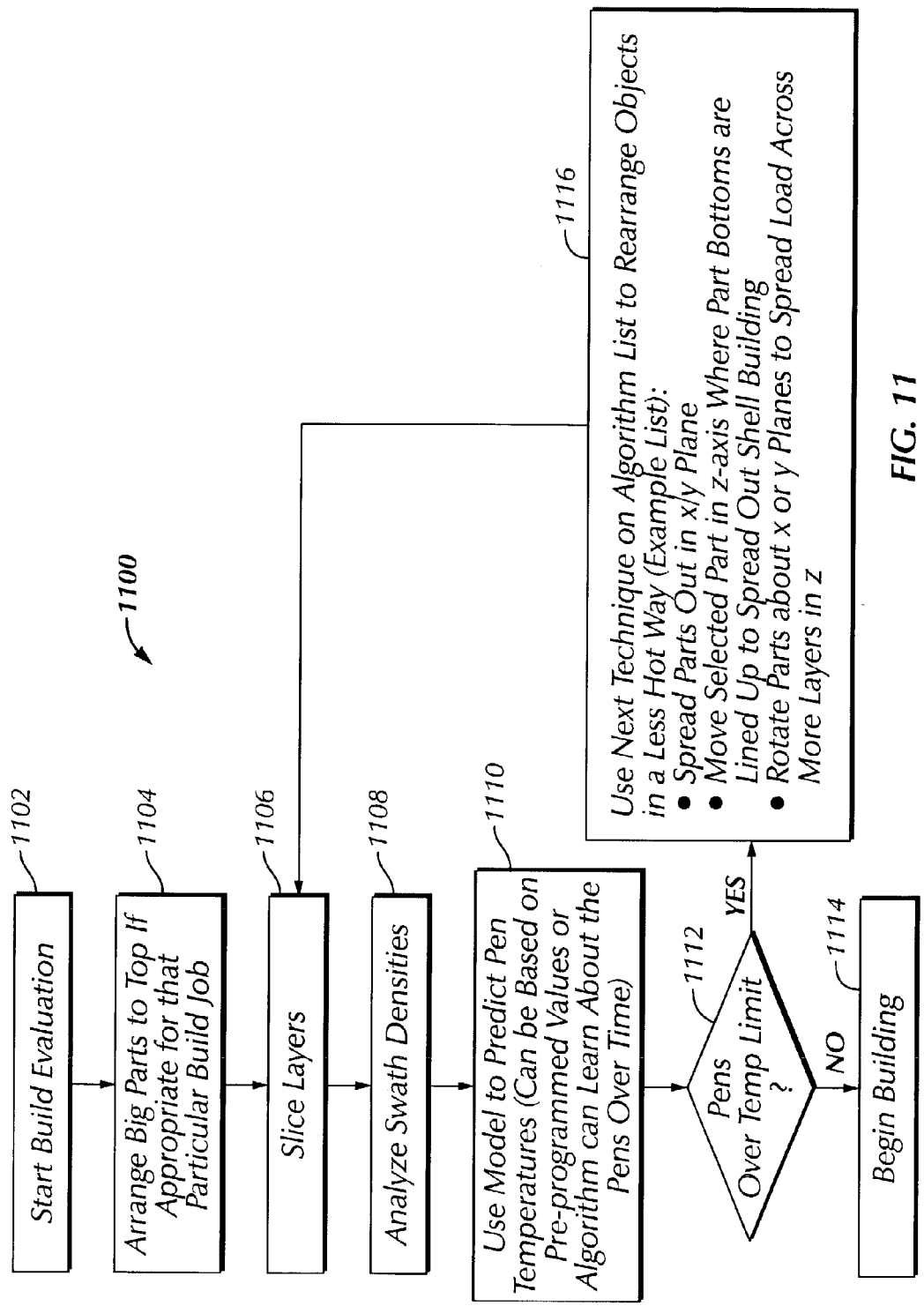
FIG. 11 is a flowchart of an exemplary method according to the present invention for controlling pen temperature in a solid freeform fabrication system wherein a pen temperature reduction technique is selected, if necessary, depending upon a predicted pen temperature.

FIG. 11 is a flowchart of an exemplary method 1100 according to the present invention for controlling pen temperature in a solid freeform fabrication system where a pen temperature reduction technique is selected, if necessary, depending upon a predicted pen temperature. At step 1102, a build evaluation is started. At step 1104, the objects are arranged for the build evaluation such that larger-sized objects, if any, are moved to the top (i.e., positioned such that the larger-sized objects are formed toward the end of the build job). At step 1106, the object arrangement is "sliced" into layers in preparation for an analysis, at step 1108, of swath densities for each of the layers. At step 1110, pen temperatures are predicted for dispensing this particular object arrangement. As discussed above, a variety of pen temperature predicting algorithms, models, etc. can be employed. Pen temperature models can be pre-programmed based on previously observed or expected characteristics of particular pens. Additionally or alternatively, pen temperature models can be adaptive; in other words, they can "learn" about the pens over time. For the purpose of predicting pen temperatures, the scope of the present invention contemplates the evaluation of any type of pen or other information that actually (or potentially) influences pen temperature during printhead operation.

At step 1112, it is next determined whether the predicted pen temperatures for the analyzed object arrangement are over their temperature limits. If not, at step 1114, the build job is started using this object arrangement. However, if a predicted pen temperature is over its temperature limit, the processing advances to step 1116 where one or more techniques are employed to rearrange the objects in a "less-hot" way. For example, and as discussed above, a new object arrangement is created by: spreading parts out in the x-y plane, moving a selected part or parts in the z-axis to spread out shell dispensing to different layers, and/or rotating a part or parts about the x or y planes to spread load across more layers in z. Steps 1106, 1108, 1110 and 1112 are repeated until a negative determination is made at step 1112.

Thus, by way of example, a method for controlling pen temperature in a solid freeform fabrication system according to the present invention includes the steps of: predicting a pen temperature that would result from employing the solid freeform fabrication system to fabricate a plurality of objects positioned relative to each other according to an object layout; and employing one or more pen temperature reduction techniques depending upon the predicted pen temperature. In various embodiments, the objects are arranged in the object layout depending upon: sizes of the objects, a priority of at least one of the objects, and/or a likelihood of job failure associated with at least one of the objects. In various embodiments, the one or more pen temperature reduction techniques include changing the object layout such that one or more of the objects is: repositioned within a x-y plane of a dispense layer, repositioned along a z-axis perpendicular to a dispense layer, and/or rotated about an axis parallel to a dispense layer.

A method of making three-dimensional objects according to another embodiment of the present invention includes the steps of: predicting pen temperatures for different object layouts for a three-dimensional fabricator; selecting one of the object layouts for a build job depending upon the predicted pen temperatures; and controlling the three-dimensional fabricator to fabricate the objects according to the selected object layout.

Figure 12:
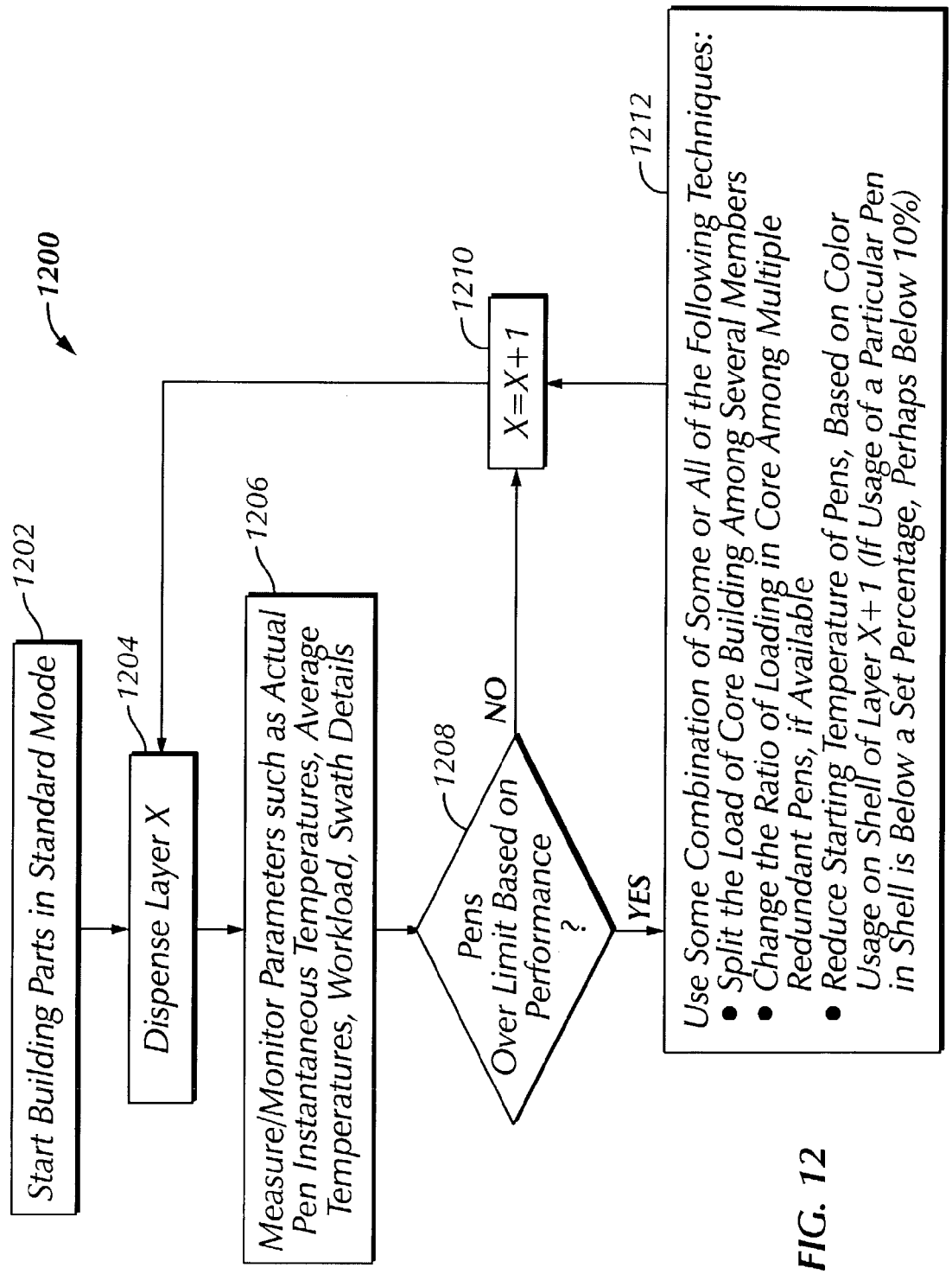
FIG. 12 is a flowchart of an exemplary method according to the present invention for controlling pen temperature in a solid freeform fabrication system wherein one or more pen temperature reduction technique are employed, if necessary, depending upon one or more parameters pertaining to the solid freeform fabrication system.

FIG. 12 is a flowchart of an exemplary method 1200 according to the present invention for controlling pen temperature in a solid freeform fabrication system where one or more pen temperature reduction technique are employed, if necessary, depending upon one or more parameters pertaining to the solid freeform fabrication system. At step 1202, a build job is started. At step 1204, a layer denoted as "Layer X" is dispensed. At step 1206, one or more parameters such as actual pen instantaneous temperatures, average temperatures, workload, and/or swath details are measured/monitored and evaluated to determine, at step 1208, based on performance whether the pen temperatures are over their temperature limits. If not, at step 1210, "X" in Layer X is incremented and, at step 1204, the next layer (Layer X) of the build job is dispensed. However, if a pen temperature is over its temperature limit, the processing advances to step 1212 where one or more "reactive" techniques are employed to reduce pen temperature. For example, one or more of the following techniques are implemented: splitting the load of core dispensing among several members (pens), changing the ratio of loading in core among multiple redundant pens, if available, and reducing the starting temperature of pens based on color usage on the shell of Layer X+1 (e.g., if usage of a particular pen in the shell is below a threshold percentage, for example, 10%). After the one or more techniques are employed, at step 1204, the next layer is dispensed and the above-described parameter measuring/monitoring process is continued throughout the build job until completion.

Figure 13:
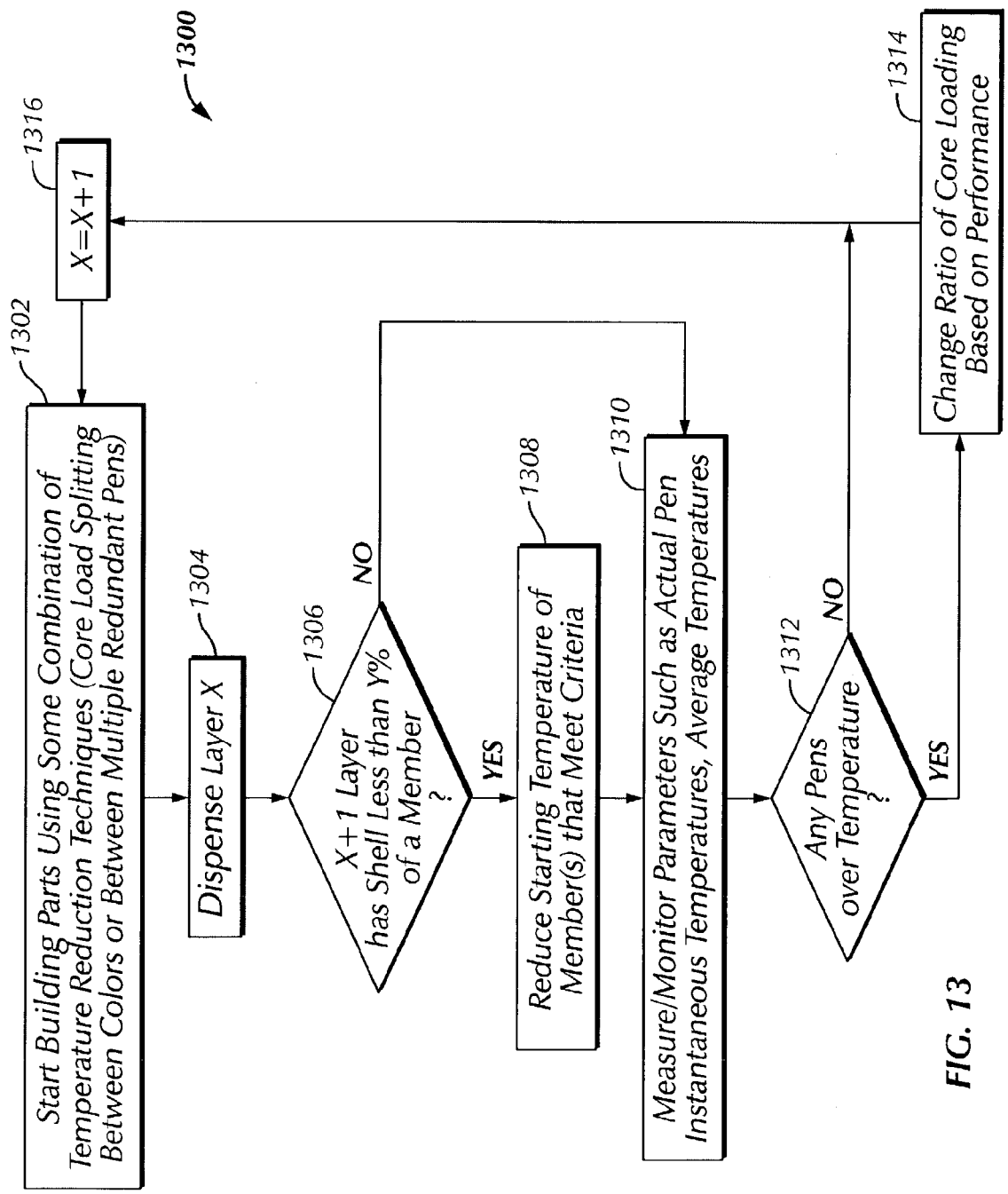
FIG. 13 is a flowchart of an exemplary method according to the present invention for controlling pen temperature in a solid freeform fabrication system wherein proactive and/or reactive pen temperature reduction techniques are employed, if necessary, depending upon one or more parameters pertaining to the solid freeform fabrication system.

FIG. 13 is a flowchart of an exemplary method 1300 according to the present invention for controlling pen temperature in a solid freeform fabrication system where proactive and/or reactive pen temperature reduction techniques are employed, if necessary, depending upon one or more parameters pertaining to the solid freeform fabrication system. At step 1302, one or more "proactive" techniques are employed to reduce pen temperature—before Layer X is dispensed at step 1304. For example, one or more of the following techniques are implemented: core load splitting between colors, and core load splitting between multiple redundant pens. At step 1306, it is next determined whether Layer X+1 has less shell than Y % of a particular member (pen). If this determination is affirmative, at step 1308, an additional proactive technique, e.g., reducing the starting temperature of the member(s) that meet these criteria, is implemented. (In other words, if particular members are contributing only small percentages of material to the shell, the temperatures of such members can be reduced.) If not, the processing advances to step 1310 where parameters such as actual pen instantaneous temperatures, average temperatures, etc. are measured/monitored and evaluated to determine, at step 1312, based on performance whether the pen temperatures are over their temperature limits. If not, at step 1316, "X" in Layer X is incremented and the build job continues. However, if a pen temperature is over its temperature limit, the processing advances to step 1314 where one or more "reactive" techniques are employed to reduce pen temperature. For example, the ratio of core loading is changed. After the one or more techniques at step 1314 are employed, the processing advances to step 1316 and then to step 1302 with the above-described proactive and/or reactive pen temperature reduction techniques continuing to be employed throughout the build job until completion.

Thus, by way of example, a method for controlling pen temperature in a solid freeform fabrication system according to the present invention includes the steps of: evaluating one or more parameters pertaining to the solid freeform fabrication system; and employing one or more pen temperature reduction techniques depending upon the one or more parameters. In various embodiments, the one or more parameters include: pen temperature information (e.g., current and/or average pen temperature information), pen workload information, and/or swath information. In various embodiments, the one or more pen temperature reduction techniques include: controlling the solid freeform fabrication system to dispense an object core using a plurality of different colored pens, controlling the solid freeform fabrication system to dispense an object core using a plurality of same colored pens, and/or reducing a pen starting temperature associated with the solid freeform fabrication system.

A method of making three-dimensional objects according to another embodiment of the present invention includes the steps of: monitoring pen information during a fabrication job performed by a three-dimensional fabricator; and evaluating the pen information to control pens of the three-dimensional fabricator to reduce a temperature of the pens.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A solid freeform fabrication method for forming an object defined by a core and shell, comprising:
    forming at least one layer of the object, wherein a core portion of the layer is formed by dispensing liquid from a plurality of printheads;
    monitoring printhead temperatures while fabricating the object and, when a printhead temperature thermal limit is reached, employing one or more reactive printhead temperature reduction techniques that include changing a ratio of core loading among said plurality of printheads.

2. A method for proactively and reactively controlling printhead temperature in a solid freeform fabrication system, comprising:
    evaluating one or more parameters pertaining to the solid freeform fabrication system, the one or more parameters including swath information pertaining to a core and a shell of a next layer of a three-dimensional object being fabricated by the solid freeform fabrication system;
    prior to dispensing individual layers of the three-dimensional object and prior to a printhead temperature thermal limit being reached, employing one or more proactive pen temperature reduction techniques depending upon the one or more parameters including controlling the solid freeform fabrication system to dispense the core using a plurality of printheads splitting a load of core dispensing among the plurality of printheads depending on he swath information; and
    monitoring printhead temperatures while fabricating the three-dimensional object and, when a printhead temperature thermal limit is reached, employing one or more reactive printhead temperature reduction techniques that include changing a ratio of core loading among said plurality of printheads.

3. The method for proactively and reactively controlling printhead temperature in a solid freeform fabrication system of claim 2, wherein:

the one or more parameters include printhead temperature information.

4. The method for proactively and reactively controlling printhead temperature in a solid freeform fabrication system of claim 3, wherein:

the printhead temperature information includes current printhead temperature information.

5. The method for proactively and reactively controlling printhead temperature in a solid freeform fabrication system of claim 3, wherein:

the printhead temperature includes average printhead temperature information.

6. The method for proactively and reactively controlling printhead temperature in a solid freeform fabrication system of claim 2, wherein:

the one or more parameters include printhead workload information.

7. The method for proactively and reactively controlling printhead temperature in a solid freeform fabrication system of claim 2, wherein:

the object core is dispensed using a plurality of different color printheads.

8. The method for proactively and reactively controlling printhead temperature in a solid freeform fabrication system of claim 2, wherein:

the object core is dispensed using a plurality of same colored printheads.

* * * * *

UNITED STATES PATENT AND TRADEMARK OFFICE
CERTIFICATE OF CORRECTION

PATENT NO. : 7,306,758 B2 Page 1 of 1
APPLICATION NO. : 10/388949
DATED : December 11, 2007
INVENTOR(S) : Jeffrey A Nielsen et al.

It is certified that error appears in the above-identified patent and that said Letters Patent is hereby corrected as shown below:

In column 10, line 65, in Claim 2, delete "he" and insert -- the --, therefor.

Signed and Sealed this

Seventeenth Day of June, 2008

JON W. DUDAS
*Director of the United States Patent and Trademark Office*